United States Patent Office 2,771,490
Patented Nov. 20, 1956

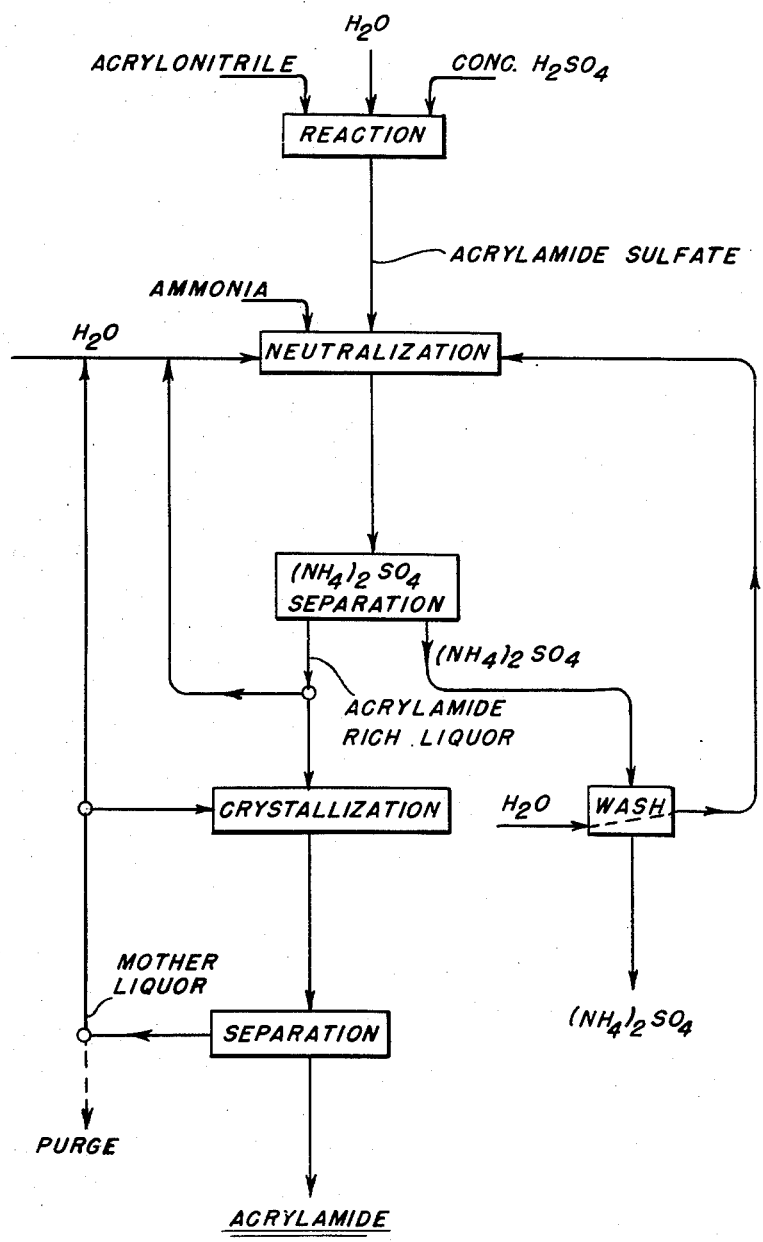

2,771,490
PRODUCTION OF ACRYLAMIDE

Edgar A. Stoddard, Jr., Brighton, Mass., and Stewart F. Williams, Wilton, Conn., assignors to American Cyanamid Company, New York, N. Y., a corporation of Maine Application August 3, 1955, Serial No. 526,138

2 Claims. (Cl. 260—561)

This invention relates to unsaturated organic amides. More particularly, it relates to the preparation of unsaturated organic amides, especially acrylamide. Still more particularly, it relates to the isolation of acrylamide from acrylamide sulfate.

One method of preparing unsaturated amides comprises reacting the corresponding nitrile with concentrated sulfuric acid and water. The resultant reaction mixture comprising the amide sulfate is then treated to isolate the free amide. In the case of amides insoluble in water, isolation is easily accomplished by addition of the reaction mixture to excess water and/or ice. Acrylamide, however, is exceedingly soluble in water, about 200 grams per 100 grams of water at 30° C., and, accordingly cannot be isolated in this manner.

Various procedures have been suggested for isolating water-soluble acrylamide from acrylamide sulfate. One such procedure comprises treating an aqueous acrylamide sulfate solution with lime to remove the sulfuric acid as insoluble calcium sulfate. After separation, the aqueous acrylamide solution is concentrated and cooled to crystallize acrylamide, which is then separated by conventional means. This process, however, is subject to certain disadvantages. For instance, the concentration step is not only time consuming, but it creates a polymerization problem. In addition, because of the physical nature of the calcium sulfate cake, much dissolved acrylamide is retained by the latter during separation. A still further disadvantage lies in the fact that the calcium sulfate by-product is of little, if any, value.

Another proposal for isolating acrylamide comprises neutralizing acrylamide sulfate with ammonia in a non-aqueous organic solvent in which ammonium sulfate is insoluble. After separation of the ammonium sulfate, the solution is concentrated and cooled to isolate solid acrylamide. This procedure likewise has its disadvantages. For instance, neutralization is slow and incomplete. Additionally, by-products also may be formed by reaction of sulfuric acid with the solvent. Still further, the process necessarily requires a non-aqueous organic solvent with attendant high cost as well as toxicity, flammability, and recovery problems.

More recently, it has been proposed to isolate acrylamide by treating acrylamide sulfate with ammonia and water to remove the sulfuric acid as ammonium sulfate. In accordance with this proposal, acrylamide sulfate and ammonia are reacted in water under conditions to provide a substantially saturated acrylamide solution at temperatures between about 20° C. and 60° C., and preferably from about 40° C.–50° C. Precipitated ammonium sulfate is separated and the residual solution cooled to crystallize acrylamide. Crystalline acrylamide is then separated, washed and dried. It is necessary in this procedure to insure that the water content during neutralization is such as to produce a saturated or near saturated solution of acrylamide at the temperature at which ammonium sulfate is to be precipitated. This has the drawback, particularly when the process is operated in a continuous manner, that the consistency of the resultant ammonium sulfate slurry may be such as to make handling thereof, as by pumping, filtering, and the like operations, difficult.

It is, therefore, the object of this invention to provide a process for the isolation of acrylamide from an aqueous acrylamide sulfate solution. It is a further object of this invention to improve on the above-described acrylamide recovery procedure involving the reaction of acrylamide sulfate, water and ammonia by controlling the water content of the reaction mixture in a simple, but extremely effective, manner. In general, the process may be quite simply stated. A predetermined portion of the acrylamide-rich liquor, obtained after separation of ammonium sulfate, is recycled to the neutralization step. In this manner, the consistency of the resultant ammonium sulfate slurry may be readily controlled within the limits desired, while at the same time maintaining a saturated or near saturated acrylamide solution at the ammonium sulfate separation temperature.

The process of the present invention will be further discussed with reference to the attached drawing. Therein is shown a flow diagram illustrating the sequence of operational steps comprising the improvement of this invention in the continuous isolation of acrylamide from acrylamide sulfate by neutralization with ammonia in water.

The initial step in the process, as indicated on the flow sheet, is the reaction of acrylonitrile with concentrated sulfuric acid and water to produce a solution of acrylamide sulfate. The resultant reaction mixture is then added to an aqueous liquor comprising acrylamide and ammonium sulfate so as to give a solution substantially saturated with acrylamide at the selected separating temperature. This is indicated on the drawing as the neutralization step. Preferably, simultaneous addition of ammonia as the neutralizing agent is also made. While addition of ammonia need not be simultaneous, it is desirable, since in this manner the hydrogen ion concentration may be simply controlled within the optimum range. Ammonia may be introduced in any of its forms. It is an advantage, however, that it may be introduced as an anhydrous gas and/or liquid. Addition of ammonia is preferably accompanied by agitation in any conventional manner to provide maximum dispersion.

It has been found that the hydrogen ion concentration during neutralization should be controlled between that equivalent to about a pH of 2 and a pH of 7. At lower pH's, as well as higher pH's, formation of by-products, as well as polymerization, begins to occur in the aqueous acrylamide solution. Preferably, the hydrogen ion concentration should be maintained between a pH of about 3.5 to about 6.5. By simultaneous addition of acrylamide sulfate and ammonia as above described, the pH may be readily maintained within these desired limits.

Since the solubility of ammonium sulfate is a substantially saturated aqueous acrylamide solution increases with decreasing temperature, selective crystallization of acrylamide from ammonium sulfate theoretically may occur over a wide temperature range. It is desirable, however, to separate the ammonium sulfate at a temperature between about 20° C. and 60° C., and preferably at a temperature of about 40°–50° C. Within these limits, the solubility of ammonium sulfate in a saturated acrylamide solution is quite low. As indicated on the flow diagram, ammonium sulfate is then separated, as by filtration. The solids so obtained are then washed with water or an aqueous solution of ammonium sulfate and dried, and the wash water recycled to the neutralizer as reaction medium.

As shown on the drawing, the residual acrylamide-rich liquor is then divided into two flows. One flow is treated to crystallize acrylamide. This is accomplished by subjecting the liquor to cooling. Cooling may be conducted to the extent desired, it being limited only by the fact that the aqueous liquid phase be maintained. Acrylamide solutions initially saturated at temperatures within the described range of 20°–60° C. will generally not be cooled below about 15°–20° C. While it may very well be cooled to as low as 0° C., the small increase in recovery of crystalline acrylamide is not warranted by the additional cooling requirements. Since the solubility of ammonium sulfate in saturated aqueous acrylamide liquor increases as the temperature decreases, there will be no precipitation of any ammonium sulfate which may have remained in the solution. The resultant acrylamide crystals may be separated by conventional means, washed, and dried. The mother liquor obtained by this separation may also be recycled to the neutralizer as reaction medium for the neutralization of additional acrylamide sulfate and/or to the acrylamide crystallizer to control the pulp density at that point.

The remaining flow of acrylamide-rich liquor, and the one which constitutes the subject matter of this invention, is recycled to the neutralizer without being cooled, or at least at a temperature at which all the acrylamide remains in the solution. The amount of acrylamide-rich liquor recycled is governed by the desired density of the neutralized liquor. Densities of the neutralized liquor as high as 50% solids by weight may be conveniently handled by pumps and allied equipment. Preferably, however, the density should be about 15–35% solids. In accordance with this, taking into consideration the recycle streams of mother liquor and wash water, the amount of recycled acrylamide-rich liquor may be readily determined so as to provide the desired density in the neutralizer and give a substantially saturated acrylamide solution at the selected separating temperature. The temperature of the recycled acrylamide-rich liquor will be substantially that of the selected temperature of separation of ammonium sulfate. Under these conditions, therefore, while the density of the resultant ammonium sulfate slurry may be decreased to that desired, the dissolved acrylamide concentration of the neutralized solution will not be altered to any appreciable extent.

The process of this invention is further described by the following examples, which are intended as illustrative only and not by way of limitation.

*Example 1*

To 100 parts of water is added 326 parts of crude acrylamide sulfate and 67 parts of gaseous ammonia at 42° C., the addition being simultaneous and at such rates as to maintain the pH between 3–5. Resultant slurry comprising 264 parts of ammonium sulfate at a density of 51% solids is centrifuged at a temperature of 40° C. to separate crude ammonium sulfate crystals. The residual acrylamide-rich liquor containing 142 parts of acrylamide is cooled to crystallize acrylamide which is separated. Mother liquor is recycled to the neutralizer as reaction medium.

*Example 2*

The procedure of Example 1 is repeated except that the reaction medium comprises, in addition, 50% of the acrylamide-rich liquor obtained from the ammonium sulfate separation step of Example 1. On completion of neutralization, the density of the slurry is 42%, while the dissolved acrylamide concentration is the same as in Example 1.

*Example 3*

The procedure of Example 2 is repeated except that 80% of the acrylamide-rich liquor is recycled. On completion of neutralization, the density of the slurry is 39%, while the acrylamide concentration is the same as in Example 1.

It is apparent from Examples 2 and 3 that the density of the slurry in the neutralizer may be varied while maintaining a near saturated acrylamide solution at the selected ammonium sulfate separation temperature. The examples illustrate the invention without taking into consideration the recycle streams of mother liquor and ammonium sulfate wash water. In actual practice in a continuous manner, these recycle streams are so controlled with respect to the recycle of acrylamide-rich liquor as to give a slurry density within the preferred range of 15–35% solids.

We claim:

1. In a continuous process for recovering monomeric acrylamide from acrylamide sulfate which comprises neutralizing acrylamide sulfate with ammonia in an aqueous medium thereby precipitating ammonium sulfate giving an aqueous slurry comprising dissolved acrylamide and crystalline ammonium sulfate; the amount of ammonia being such as to neutralize substantially the entire sulfuric acid content of said acrylamide sulfate, and the amount of said acrylamide sulfate being such as to provide after neutralization an aqueous slurry substantially saturated with acrylamide at a temperature of at least 20° C.; maintaining the hydrogen ion concentration during neutralization at a range equivalent to a pH of about 2 to about 7; separating precipitated ammonium sulfate at a temperature of at least 20° C.; and treating residual liquor to recover an acrylamide product, the improvement in combination therewith which comprises: prior to said treatment, dividing said residual liquor into several streams, and recycling one stream to the neutralization step whereby the density of the aqueous ammonium sulfate slurry is maintained below a predetermined density while maintaining said slurry substantially saturated with acrylamide.

2. A process according to claim 1 in which the amount of recycled liquor is such as to provide after neutralization an aqueous slurry having a density not exceeding about 35% by weight.

References Cited in the file of this patent

UNITED STATES PATENTS 1,985,255    Isbell _____ Dec. 25, 1934